United States Patent [19]

Yeakey et al.

[11] 4,439,551

[45] Mar. 27, 1984

[54] PACKAGING FOAM POLYURETHANE COMPOSITION EMPLOYING NOVEL POLYOL BLEND

[75] Inventors: Ernest L. Yeakey; Michael Cuscurida; Michael E. Brennan, all of Austin, Tex.

[73] Assignee: Texaco, Inc., White Plains, N.Y.

[21] Appl. No.: 476,736

[22] Filed: Mar. 18, 1983

[51] Int. Cl.$^3$ .............................................. C08G 18/14
[52] U.S. Cl. .................................. 521/131; 252/182; 252/357; 521/45.8; 521/172; 521/173; 528/308.1; 560/92
[58] Field of Search ............. 521/172, 173, 131, 48.5; 528/308.1; 560/92; 252/182, 357

[56] References Cited

U.S. PATENT DOCUMENTS

| | | | |
|---|---|---|---|
| 3,590,070 | 6/1971 | Martin et al. | 560/93 |
| 4,048,104 | 9/1977 | Svoboda et al. | 521/48.5 |
| 4,223,068 | 9/1980 | Carlstrom et al. | 521/48.5 |

*Primary Examiner*—Maurice J. Welsh
*Attorney, Agent, or Firm*—Jack H. Park; Kenneth R. Priem; David L. Mossman

[57] ABSTRACT

Economical, open-celled packaging foams of better quality than foams from commercial aromatic polyester polyols may be prepared with a novel polyol blend. The most important component in the polyol blend is an aromatic polyester polyol made from dibasic acid waste streams and recycled polyethylene terephthalate. This type of polyol made from waste or recycled reactant streams is economical to make and serves as an inexpensive substitute for a portion of more expensive amino polyols normally used.

17 Claims, No Drawings

PACKAGING FOAM POLYURETHANE COMPOSITION EMPLOYING NOVEL POLYOL BLEND

CROSS-REFERENCE TO RELATED APPLICATION

U.S. Pat. application Ser. No. 443,778 filed on Nov. 22, 1982 reveals aromatic polyols used in the novel polyol blend herein which may be made from recycled polyethylene terephthalate, and alkylene glycol and dibasic acid waste streams.

BACKGROUND OF THE INVENTION

1. Field of the Invention

The invention relates to polyol blends to be used in low density packaging foams and more particularly relates to such blends and foams which use an aromatic polyester polyol made from recycled polyethylene terephthalate and alkylene glycol and dibasic acid waste streams.

2. Description of Relevant Compounds and Methods in the Field

Open-celled, low density packaging foams are widely used for the encapsulation or packaging of shock-sensitive objects. These foams are generally made by mixing two preformulated components, commonly called the A-component and the B-component. The A-component typically contains the isocyanate compound that must be reacted with the constituents of the B-component to form the packaging foam. The B-component contains the balance of the foam ingredients; namely, polyol, water, surfactant, fluorocarbon and amine catalyst. A typical B-component will contain 10 to 30 parts by weight (pbw) water, 15 to 40 pbw fluorocarbon and 100 pbw polyol, plus small quantities of catalyst and surfactant.

U.S. Pat. No. 4,087,389 to Olin Corporation describes packaging foam compositions prepared from a reaction mixture characterized by high levels of water and an organic foaming agent, and a reaction mixture NCO-/OH index of from about 30 to about 60. The composition employs a triol obtained by condensing one mole of glycerine first with propylene oxide, then with ethylene oxide. Canadian Pat. No. 866,233 is another patent in this field that discloses how low density, open-celled polyurea foams may be made by reacting undistilled aromatic polyisocyanurates with water.

Another type of polyisocyanurate foam employs a polyol blend using both amide diols and primary hydroxyl polyols to give a foam having a large reaction exotherm, making it particularly suited to the preparation of polyisocyanurate foam laminates, according to U.S. Pat. No. 4,246,364.

As noted, one of the polyols used in the invention herein is an aromatic polyester polyol made from scrap polyethylene terephthalate (PET). Scrap PET is known to be incorporated into polyurethanes. For example, U.S. Pat. No. 4,048,104 relates that polyisocyanate prepolymers for use in polyurethane products may be prepared by combining an organic polyisocyanate with polyols which are the hydroxylterminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

Also relevant to this plyol portion of the invention is U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the SPI 25th Annual Urethane Division Technical Conference, Scottsdale, Arizona (October, 1979), describe other foams prepared from the polyols of U.S. Pat. No. 3,647,759. However, one of the problems with the polyols of U.S. Pat. No. 3,647,759 is that they are not very compatible with trichlorofluoromethane, the gas commonly used as a blowing agent.

Another of the polyols used in the invention herein is made as described in U.S. Pat. No. 4,137,265, incorporated by reference herein.

SUMMARY OF THE INVENTION

The invention concerns a method for making low density packaging polyurethane foam by reacting in the presence of a tertiary amine catalyst and a blowing agent, an organic polyisocyanate and a polyol blend containing 10 to 25 weight percent of an aromatic polyester polyol. The aromatic polyester polyol has a hydroxyl number of from 210 to 230 and is made by esterifying, in the absence of a catalyst, a dibasic acid waste stream with an alkylene glycol, the reaction product of which is transesterified with recycled polyethylene terephthalate.

DETAILED DESCRIPTION OF THE PREFERRED EMBODIMENTS

Typically, a single polyol is used to react with the polyisocyanate to give a low-density packaging foam. However, in this invention a blend of polyols and alcohols (known here as surfactants) are found to be useful. Instead of using a single polyol, which may be expensive, part of the blend is made up of polyols made from residues and scraps. This partial replacement of expensive polyols with inexpensive polyols makes the foams of this invention more economical. Surprisingly, good packaging foams are obtained even though some cheaper polyols are employed.

Aromatic Polyester Polyols

The novel aromatic polyester polyol mixtures are made by using a recycled polyethylene terephthalate (PET). This may be any scrap residue from old polyethylene terephthalate which contains compounds which have the moiety

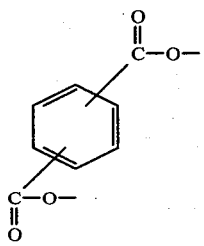

Generally, the scrap or recycled polyethylene terephthalate may be in any particulate form. A frequently seen form is fragmentized soft drink bottles which appear as clear or colored chips. Polyethylene terephthalate film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in making these polyols, the recycled PET chips without the solvent is also useful.

The polyester polyol with which the polyethylene terephthalate scrap is reacted is produced by the esterification of a residue of dibasic acid manufacture, as noted before. Dibasic acids are those acids which have two displaceable hydrogen atoms. Examples of such acids are succinic, glutaric and adipic acid. Especially preferred are the residues from adipic acid which contain portions of each of the three acids listed above. It is necessary that the acids be dibasic so that polymer chains can be formed upon reaction with the glycol. These materials may also include waste dicarboxylic acids.

Preferably, the alkylene glycol has the formula

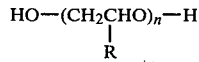

where R is hydrogen or lower alkyl of one to four carbon atoms and n is from 1 to 3. Glycols which meet this definition are ethylene glycol, propylene glycol (1, 2-propylene glycol), diethylene glycol (DEG), dipropylene glycol, and triethylene glycol (TEG), among others. The glycol may be a residue or flash-separated glycol.

The polyester polyol which results from the reaction of the dibasic acid residue and an alkylene glycol may be a diester diol. Such a diol may be defined by the formula

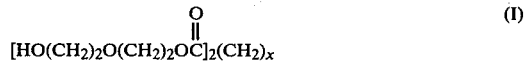

where x is 2 to 4.

The proportions of the reactants should be such as to give a resulting mixture of aromatic polyester polyols which have an average OH (hydroxyl) number within the desired range of about 100 to 400. The saponification number of the scrap polyethylene terephthalate (a measure of transesterification sites) should be considered in selecting proportions, if obtainable. One PET unit has a molecular weight of 192.2. Preferably the approximate mole ratio of scrap polyethylene terephthalate to dibasic acid to alkylene glycol may be about 1:1:2. These proportions could vary 5% in either direction. What actually forms the "polyol" is a mixture of polyols having ester functions, even though the mixture is sometimes a singular "polyol".

Generally, both reactions need heat between ambient and about 300° C. to proceed. Preferably, the temperature for both steps should be between 140° and 220° C. Unlike some prior art processes, both steps are noncatalytic. The pressure can be atmospheric, subatmospheric or autogenous. The polyol should have a hydroxyl number in the range of 100 to 400, with an especially preferred hydroxyl number range of 125 to 300. For the purposes of this invention, the hydroxyl number should range from about 210 to 230.

The structure of these aromatic polyester polyols has been identified as follows:

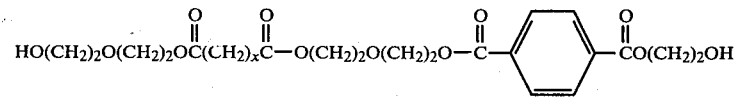

where x is an integer of from 2 to 4. The mixture that results from the process described has an average value of x of around 3.

Rigid Amino Polyols

The rigid amino polyols useful herein are called "rigid" because they are used primarily for rigid foams. These polyols are the more expensive polyols used herein and the goal is to diminish their proportion by replacing them with polyols such as those described in the previous section.

The rigid amino polyols are produced by propoxylating or ethoxylating a Mannich condensate. The Mannich reaction by which the intermediate Mannich condensates are produced is generally the reaction of phenols, formaldehyde and amines. More specifically, it is a well-known reaction wherein an active hydrogen compound is reacted with formaldehyde and a primary or secondary amine to produce a substituted aminomethyl derivative of the active hydrogen starting material. The Mannich reaction products used in preparing the compounds of our present invention are prepared by premixing one mole of the phenol or nonylphenol with one or two moles of the diethanolamine and then slowly adding the requisite quantity of formaldehyde at a temperature below the temperature of Novolak formation. The ortho and para positions of these phenolic compounds are sufficiently reactive to enter into the Mannich reaction. At the end of the formaldehyde addition, the reaction mixture is slowly heated with agitation to a temperature of at least about 50° C., such as a temperature within the range of about 80° C. to about 150° C., for a period of time sufficient to reduce the formaldehyde content to at most about 1 wt.%. This will require normally from about two to about four hours reaction time at the elevated temperature.

The formaldehyde may be employed in any of its conventional forms, such as aqueous formalin solution,an inhibited methanol-containing solution, paraformaldehyde or trioxane.

At the end of the reaction, water is stripped from the reaction mixture. The resulting crude Mannich reaction product may, without further purification, be condensed with an alkylene oxide in the manner hereinafter described, although it is preferably first purged with nitrogen at reduced pressure. If desired, the reaction product may be separated into specific components or fractions, but products obtained by reacting the entire Mannich reaction product with an appropriate quantity of alkylene oxide are included in the definition of these rigid amino polyols.

The alkylene oxide used in further condensation is preferably ethylene oxide, propylene oxide, butylene oxide or a mixture of oxides. The condensation with alkylene oxide is carried out simply by introducing the alkylene oxide, preferably under pressure, into a vessel containing the Mannich reaction product. No added catalyst is needed since the basic nitrogen in this product provides sufficient catalytic activity to promote the reaction. Temperatures between about 30° and 200° C. may be employed but the preferred temperatures are in the range of about 90° to 120° C. Under these conditions the phenolic hydroxyl group reacts first with one mole of the propylene oxide after which the remaining one or two moles reacts with the alcoholic hydroxyls to form hydroxypropoxyethyl groups. The final condensation products are purified from unreacted and partially reacted materials by vacuum stripping and are obtained as clear amber to brown liquids having hydroxyl numbers in the range of 440 to 550 and viscosities between about 15,000 and 45,000 centipoises at 25° C.

U.S. Pat. Nos. 3,297,597 and 4,137,265 to Texaco Development Corporation describe in detail the preparation of a number of these nitrogen-containing Mannich polyols, and the disclosures of those patents are incorporated by reference herein. The commercial products made under these patents by Texaco Chemical Company are known as THANOL® R-350-X and THANOL R-650-X polyols. The preferred hydroxyl number for these rigid amino polyols is in the range from about 440–540.

Organic Surfactant Alcohols

The organic surfactants used as part of the polyol blend are actually alkylene oxide adducts of monofunctional alcohols. Simply, an alkylene oxide such as ethylene oxide is added to an alcohol, preferably containing an aromatic group such as nonylphenol. The result is a long surfactant molecule with an alcoholic group on one end and an aryl group on the other. These alcoholic surfactants are made by well-known methods in the art which will further be described in the next section.

Polyether Polyols

The last constituent of the overall polyol found particularly useful in preparing rigid polyurethane packaging foams is a polyether polyol having a hydroxyl number of 20–80. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alpha-methyl glucoside. Triol initiators are preferred.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 20 to about 80. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Preferably, the last polyol is a triol having a molecular weight of at least 4,500 and a primary hydroxyl content of greater than 75%.

The Polyol Blend

The novel polyol blend of this invention is made up of the four types of polyols discussed previously. The polyols should be mixed in the following proportions: from about 10 to 25 wt.% of an aromatic polyester polyol, from about 30 to 50 wt.% of a rigid amino polyol, from about 5 to 25 wt.% of an organic surfactant and from about 25 to 35 wt.% of a polyether triol.

Polyurethane Packaging Foams

Preferably, the ingredients will be proportioned so as to provide from about 0.3 to about 0.6 mole equivalents of isocyanate groups per mole equivalent of hydroxyl groups provided by the polyol blend. However, for the shock absorbing foams of this invention we have found that the mole equivalents of isocyanate to hydroxyl groups can be as low as 0.4.

It is within the scope of the present invention to utilize an extraneously added inert blowing agent such as a gas or gas-producing material. For example, halogenated low-boiling hydrocarbons, such as trichloromonofluoromethane and methylene chloride or carbon dioxide, nitrogen, etc., may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082. The polyol blend of this invention is quite compatible with fluorocarbon blowing agents unlike some of the prior art polyols made from DMT residues. For this invention, it is preferred that the water content range from 10 to 30 parts by weight (pbw) per 100 pbw of polyol blend. It is further preferred that the proportion of fluorocarbon is 25 to 50 pbw based on 100 pbw of polyol blend.

The catalysts of this invention may be preferably a tertiary amine or a mixture of amine catalysts. Tertiary amines include trialkylamines (e.g. trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine. Suitable commercial catalysts include THANCAT ® DD, THANCAT DPA and THANCAT TD-33 catalysts, among others, made by Texaco Chemical Company, The preferred proportion of catalyst is 3 to 10 pbw per 100 pbw of the polyol blend components.

Conventional formulation ingredients are also employed such as, for example, foam stabilizers, also known as silicone oils or emulsifiers. The foam stabilizer may be an organic silane or siloxane. For example, compounds may be used having the formula:

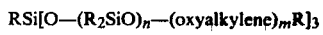

RSi[O—(R$_2$SiO)$_n$—(oxyalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

The isocyanate used in the A-component may be any aromatic polyisocyanate. Typical aromatic polyisocyanates include m-phenylene diisocyanate, p-phenylene diisocyanate, polymethylene polyphenylisocyanate, 2,4-toluene diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl) methane, and 4,4'diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weight. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. Preferably, the functionality is about 2.7. These isocyanate mixtures are known, commercially available materials and can be prepared by the process described in U.S. Pat. No. 3,362,979, issued Jan. 9, 1968 to Floyd E. Bentley.

The polyurethane packaging foams prepared here can be made in one step by reacting all the ingredients together at once (one-shot process) or the foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, etc., may be added to either the prepolymer or remaining polyol, or both, prior to the mixing of the component, whereby at the end of the reaction a polyurethane foam is provided. The foregoing methods are known to those skilled in the art, as evidenced by the following publication: DuPont Foam Bulletin, "Evaluation of Some Polyols in One-Shot Resilient Foams", Mar. 22, 1960. Other methods for making a suitable packaging foam are described in U.S. Pat. No. 4,087,389, and that disclosure is incorporated by reference herein.

The low-density, open-celled packaging foams of this invention should have a density of 0.4 to 0.7 pounds per cubic foot (pcf). These foams can be prepared at temperatures ranging from 25° to 60° C.

The invention will be illustrated further with respect to the following specific examples, which are given by way of illustration and not given as limitations on the scope of this invention.

The polyol extenders of this invention (the aromatic polyester polyols) will be compared with some commercial polyol extenders. Hercules, Inc., Wilmington, Del., sells dimethyl terephthalate (DMT) residues under the tradename of TERATE ® 101. Hercules also sells TERATE 200 series resins which are DMT resins modified with a glycol as seen in U.S. Pat. Nos. 4,237,238 and 3,647,759. The TERATE 200 series resins are useful as polyol extenders. Similar DMT residues having a different composition but still containing the aromatic esters and acids are also sold by DuPont and others. Freeman Chemical Company produces a polyol extender known as CHEMPOL ® 30-2150 which has a hydroxyl number of about 210. It is the reaction product of recycled PET, diethylene glycol and pure dimethyl glutarate, which is quite expensive. See U.S. Pat. Nos. 4,223,068 and 4,048,104 to Freeman Chemical Co.

EXAMPLE I

This example will illustrate the use of the aromatic polyester polyol of this invention in the preparation of low density packaging foams. It will further show the improved foams which can be made through use of this polyol extender as compared to a competitive prior art polyol.

| | A | B |
|---|---|---|
| Formulation, pbw | | |
| THANOL ® R-510[1] | 22.5 | — |
| TERATE © 203[2] | — | 22.5 |

-continued

|  | A | B |
|---|---|---|
| THANOL R-650-X[3] | 22.5 | 22.5 |
| THANOL SF-5505[4] | 45.0 | 45.0 |
| SUFONIC ® N-120[5] | 10.0 | 10.0 |
| Water | 20.0 | 20.0 |
| Fluorocarbon R-11b[6] | 35.0 | 35.0 |
| Y-6690 Silicone[7] | 2.0 | 2.0 |
| THANCAT ® DPA[8] | 5.0 | 5.0 |
| MONDUR MR[9] | 140.5 | 140.5 |
| Details of Preparation |  |  |
| Cream time, seconds | 12 | 12 |
| Rise time, seconds | 58 | Foam near collapse |
| Gel time, seconds | 60 | at 20–25 sec., continued to rise |
| Properties |  |  |
| Density, pcf | 0.54 | Unable to measure |
| Foam appearance | Fine smooth cells | Large coarse cells |

[1] Aromatic polyester polyol of this invention
[2] Competitive prior art polyol from Hercules
[3] Aromatic amino polyol from Texaco Chemical Co. (hydroxyl no. 460–480)
[4] 5500 molecular weight high reactivity polyol from Texaco Chemical Co.
[5] Twelve mole ethylene oxide adduct of nonylphenol; Texaco Chemical Co.
[6] Trichlorofluoromethane blowing agent
[7] Silicone surfactant; Union Carbide Chemical Corp.
[8] Two mole propylene oxide adduct of dimethylaminopropylamine; Texaco Chemical Co.
[9] 2.7 functionality polymeric isocyanate; Mobay Chemical Co.

EXAMPLE II

This example will further illustrate the use of the aromatic polyester polyol of this invention in the preparation of low density packaging foams. It will further show that foams made using the THANOL R-510 polyol have finer smoother cells than those made using the prior art TERATE 203 polyol.

|  | C | D |
|---|---|---|
| Formulation, pbw |  |  |
| THANOL R-510 | 15 | — |
| THANOL R-650-X | 35 | 35 |
| TERATE 203 | — | 15 |
| THANOL SF-5505 | 28.6 | 28.6 |
| SURFONIC N-120 | 21.4 | 21.4 |
| Water | 20.0 | 20.0 |
| Fluorocarbon R-11b | 35.0 | 35.0 |
| Y-6690 Silicone | 2.0 | 2.0 |
| THANCAT DPA | 5.0 | 5.0 |
| MONDUR MR | 140.5 | 140.5 |
| Details of Preparation |  |  |
| Cream time, seconds | 12 | 12 |
| Rise time, seconds | 55 | 42 |
| Gel time, seconds | 57 | 45 |
| Properties |  |  |
| Density, pcf | 0.56 | 0.57 |
| Cell structure | Smooth | Coarse |
| Cells per inch | 50 | 35 |

It may be readily seen from the examples that the polyol mixtures of this invention work much better in the role of polyol extenders than do commercially available materials. Many modifications may be made in the polyol mixtures of this invention and their method of production without departing from the spirit and scope of the invention which is defined only in the appended claims. For example, one skilled in the art could adjust the temperature, pressure, proportions and modes of additions to provide polyol blends that gives foams with optimal properties.

We claim:

1. A method for making low density packaging polyurethane foam comprising reacting in the presence of a tertiary amine catalyst of polyurethane formation and a blowing agent, an organic polyisocyanate and a polyol blend comprising
   a. 10 to 25 wt.% of an aromatic polyester polyol having a hydroxyl number of from 210 to 230 which is the reaction product from
      (1) esterifying, in the absence of a catalyst, a residue from dibasic acid manufacture which comprises one or more acids from the group consisting of glutaric acid, succinic acid and adipic acid, with an alkylene glycol to produce a polyester polyol intermediate, and
      (2) transesterifying, in the absence of a catalyst, recycled polyethylene terephthalate with the polyester polyol intermediate of the previous step,
   b. 30 to 50 wt.% of a rigid amino polyol having a hydroxyl number of from 440 to 540 which is based on sucrose or an aromatic amine polyol,
   c. 5 to 25 wt.% of an organic surfactant alcohol, and
   d. 25 to 35 wt.% of a polyether triol having a molecular weight of at least 4,500 and a primary hydroxyl content of greater than 75%.

2. The method of claim 1 in which the aromatic polyester polyol has the following structure

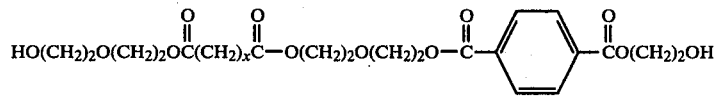

where x is an integer between 2 and 4, inclusive.

3. The method of claim 1 in which the rigid amino polyol is prepared by reacting from 2 to 3 moles of an alkylene oxide with one mole of the Mannich reaction product of a mole of phenol or nonylphenol with one or two moles of diethanolamine and one or two moles of formaldehyde.

4. The method of claim 1 in which the organic surfactant alcohol is an alkylene oxide adduct of nonylphenol.

5. The method of claim 1 in which the blowing agent is trichlorofluoromethane in a proportion of 25 to 50 parts by weight based on 100 parts by weight of the polyol blend.

6. The method of claim 1 in which the density of the resulting polyurethane packaging foam ranges from about 0.4 to 0.7 pounds per cubic foot.

7. A polyol blend composition for lowdensity packaging foam formulations comprising
   a. 10 to 25 wt.% of an aromatic polyester polyol having a hydroxyl number of from 210 to 230 which is the reaction product from
      (1) esterifying, in the absence of a catalyst, a residue from dibasic acid manufacture which comprises one or more acids from the group consisting of glutaric acid, succinic acid and adipic acid, with an alkylene glycol to produce a polyester polyol intermediate and
      (2) transesterifying, in the absence of a catalyst, recycled polyethylene terephthalate with the polyester polyol intermediate of the previous step,
b. 30 to 50 wt.% of a rigid amino polyol having a hydroxyl number of from 440 to 540 which is based on sucrose or an aromatic amine polyol,
c. 5 to 25 wt.% of an organic surfactant alcohol, and
d. 25 to 35 wt.% of a polyether triol having a molecular weight of at least 4,500 and a primary hydroxyl content of greater than 75%.

8. The polyol blend composition of claim 7 in which the aromatic polyester polyol has a structure of the following formula

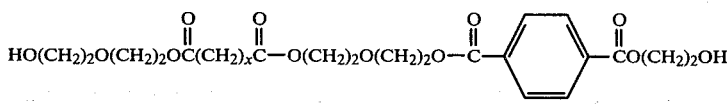

where x is an integer from 2 to 4.

9. The polyol blend composition of claim 7 in which the rigid amino polyol is prepared by reacting from 2 to 3 moles of an alkylene oxide with one mole of the Mannich reaction product of a mole of phenol or nonylphenol with one or two moles of diethanolamine and one or two moles of formaldehyde.

10. The polyol blend composition of claim 7 in which the organic surfactant alcohol is an alkylene oxide adduct of nonylphenol.

11. A low-density, open-celled packaging foam made by the process comprising
reacting in the presence of a tertiary amine catalyst of polyurethane formation and a blowing agent, an organic polyisocyanate and a polyol blend comprising
a. 10 to 25 wt.% of an aromatic polyester polyol having a hydroxyl number of from 210 to 230 which is the reaction product from
(1) esterifying, in the absence of a catalyst, a residue from dibasic acid manufacture which comprises one or more acids from the group consisting of glutaric acid, succinic acid and adipic acid, with an alkylene glycol to produce a polyester polyol intermediate, and
(2) transesterifying, in the absence of a catalyst, recycled polyethylene terephthalate with the polyester polyol intermediate of the previous step,
b. 30 to 50 wt.% of a rigid amino polyol having a hydroxyl number of from 440 to 540 which is based on sucrose or an aromatic amine polyol,
c. 5 to 25 wt.% of an organic surfactant alcohol, and
d. 25 to 35 wt.% of a polyether triol having a molecular weight of at least 4,500 and a primary hydroxyl content of greater than 75%.

12. The foam of claim 11 in which the aromatic polyester polyol has the following structure

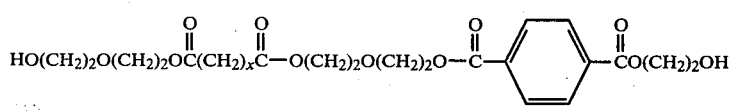

where x is an integer between 2 and 4, inclusive.

13. The foam of claim 11 in which the rigid amino polyol is prepared by reacting from 2 to 3 moles of an alkylene oxide with one mole of the Mannich reaction product of a mole of phenol or nonylphenol with one or two moles of diethanolamine and one or two moles of formaldehyde.

14. The foam of claim 11 in which the organic surfactant alcohol is an ethylene oxide adduct of nonylphenol.

15. The foam of claim 11 in which the following components were also present in the indicated proportions
a. 10 to 30 pbw of water based on 100 pbw of the polyol blend,
b. 25 to 50 pbw of a fluorocarbon based on 100 pbw of the polyol blend,
c. 3 to 10 pbw of a tertiary amine catalyst based on 100 pbw of the polyol blend, and
d. a 2.7 functionality polyisocyanate present in such a proportion that the ratio of mole equivalents of isocyanate groups to mole equivalents of hydroxyl groups ranges from 0.3 to 0.6.

16. The foam of claim 11 in which the blowing agent is trichlorofluoromethane.

17. The foam of claim 11 in which the density of the resulting packaging foam ranges from about 0.4 to 0.7 pounds per cubic foot.

* * * * *